(12) United States Patent
Rozman et al.

(10) Patent No.: US 9,240,685 B2
(45) Date of Patent: Jan. 19, 2016

(54) RECONFIGURABLE MATRIX-BASED POWER DISTRIBUTION ARCHITECTURE

(71) Applicant: HAMILTON SUNDSTRAND CORPORATION, Windsor Locks, CT (US)

(72) Inventors: Gregory I. Rozman, Rockford, IL (US); Steven J. Moss, Rockford, IL (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 542 days.

(21) Appl. No.: 13/746,214

(22) Filed: Jan. 21, 2013

(65) Prior Publication Data

US 2014/0203639 A1   Jul. 24, 2014

(51) Int. Cl.
| | |
|---|---|
| H02J 1/00 | (2006.01) |
| H02J 1/14 | (2006.01) |
| H02J 7/34 | (2006.01) |
| H02J 7/14 | (2006.01) |
| H01H 47/00 | (2006.01) |
| H02J 3/00 | (2006.01) |
| H02J 1/10 | (2006.01) |

(52) U.S. Cl.
CPC ... *H02J 1/00* (2013.01); *H02J 1/14* (2013.01); *H02J 7/1423* (2013.01); *H02J 7/34* (2013.01); *H02J 3/005* (2013.01); *H02J 2001/106* (2013.01); *H02J 2007/143* (2013.01); *Y10T 307/383* (2015.04)

(58) Field of Classification Search
USPC ......................................... 307/126
See application file for complete search history.

(56) References Cited

U.S. PATENT DOCUMENTS

| | | | |
|---|---|---|---|
| 4,618,779 | A | 10/1986 | Wiscombe |
| 6,586,850 | B1 | 7/2003 | Powers |
| 7,007,179 | B2 | 2/2006 | Mares et al. |
| 7,564,147 | B2 | 7/2009 | Michalko |
| 7,970,497 | B2 | 6/2011 | Derouineau et al. |
| 7,986,057 | B2 | 7/2011 | Ganev et al. |
| 8,390,151 | B2 | 3/2013 | Rozman et al. |
| 8,519,686 | B2 | 8/2013 | Rozman et al. |
| 8,536,730 | B2 | 9/2013 | Rozman et al. |
| 8,553,373 | B2 | 10/2013 | Rozman et al. |
| 8,625,243 | B2 | 1/2014 | Rozman et al. |
| 2003/0168913 | A1* | 9/2003 | Kinnard .................... H02J 1/10 307/29 |
| 2008/0303353 | A1 | 12/2008 | Yu et al. |
| 2011/0276190 | A1 | 11/2011 | Lillis et al. |
| 2013/0278193 | A1 | 10/2013 | Rozman et al. |

FOREIGN PATENT DOCUMENTS

| | | |
|---|---|---|
| EP | 2562899 A2 | 2/2013 |
| EP | 2632048 A1 | 8/2013 |
| WO | 2009153657 A1 | 12/2009 |

OTHER PUBLICATIONS

Extended European Search Report, Issued Nov. 24, 2014 in corresponding EP Application No. 14151924.9.

* cited by examiner

*Primary Examiner* — Robert Deberadinis
(74) *Attorney, Agent, or Firm* — Cantor Colburn LLP

(57) ABSTRACT

A power management and distribution (PMAD) system includes a first power supply of a first type, a second power supply of a second type different from the first type and first and second loads. The PMAD system includes a matrix of solid state power controllers (SSPCs) connected between the first and second power supplies and the first and second loads. The matrix is configured to selectively supply each of the first and second loads with a plurality of different power levels based on on/off states of the SSPCs of the matrix.

20 Claims, 3 Drawing Sheets

RECONFIGURABLE MATRIX-BASED POWER DISTRIBUTION ARCHITECTURE

BACKGROUND OF THE INVENTION

Embodiments of the invention relate to a power distribution architecture, and more particularly to a reconfigurable matrix-based DC power management and distribution architecture to distribute power to various vehicle systems.

Typical redundant power distribution architecture utilizes two power buses connected via diodes to a plurality of loads. If one bus is unavailable, due to a faulty power source for example, power is automatically transferred from a first bus to the second bus via an "OR" diode. A solid state power controller (SSPC) may be used in a power management and distribution system to replace traditional electromechanical circuit breaker. Its main functions are to distribute power and protect various electrical loads. In comparison to electromechanical devices, SSPCs provide relatively fast response time, and may eliminate arcing during turn-off transient and bouncing during turn-on transient. SSPCs facilitate advanced protection and diagnostics, allowing for efficient power management and distribution architectures. In power distribution architectures, SSPCs are used to identify and prevent overload and short circuit conditions. SSPC includes power semiconductor switching devices that control power (voltage and/or current) supplied to a load. Some SSPCs include power semiconductor switching devices, sensors to monitor output voltage and current and power semiconductor device temperature, and a control circuitry. The control circuitry may include a microcontroller consisting of an arithmetic logic unit (ALU), memory, timer/counters, serial port, input/output (I/O) ports, and clock oscillator. Some SSPCs are programmable by a computer, user or by any proprietary method.

In the case of a faulty load, SSPC or power supply, power is interrupted to the load leading to interruption of one or more functions.

BRIEF DESCRIPTION OF THE INVENTION

Embodiments of the present invention include a power management and distribution (PMAD) system including a first power supply of a first type, a second power supply of a second type different from the first type and first and second loads. The PMAD system includes a matrix of solid state power controllers (SSPCs) connected between the first and second power supplies and the first and second loads. The matrix is configured to selectively supply each of the first and second loads with a plurality of different power levels based on on/off states of the SSPCs of the matrix.

Embodiments of the invention further include a power management and distribution (PMAD) controller of a matrix-based PMAD system. The PMAD controller includes a summing amplifier configured to receive as inputs first and second sensed current signals from first and second current sensors of an SSPD matrix between a plurality of power supplies and a plurality of loads. The PMAD controller also includes a reference voltage modification circuit configured to receive as an input a summed sensed current signal from the summing amplifier, to generate first and second current reference signals by multiplying the summed sensed current signal by a fraction corresponding to a fraction of total current supplied to first and second loads among the plurality of loads, and to output to first and second power supplies among the plurality of power supplies first and second reference voltage modification signals based on the first and second current reference signals to modify a voltage output from the first and second power supplies.

Embodiments of the invention further include a method of controlling a matrix-based power management and distribution (PMAD) system. The method includes determining a level of power to be received by each of a plurality of loads and controlling a matrix of solid-state power controllers (SSPCs) connected between a plurality of power supplies and the plurality of loads to deliver the level of power to the loads. The plurality of power supplies includes a first power supply of a first type and a second power supply of a second type different than the first type.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION OF THE INVENTION

Power management and distribution systems including a plurality of power supplies, loads, and solid state power controllers are subject to failures. In addition, required fault tolerance for critical loads may result in additional redundant power supplies, power buses and SSPCs to supply power to the critical loads. In addition, to accommodate variable load demands, for example during overload condition, the SSPCs and power supplies are selected to be relatively large to be able to accommodate large levels of power. Embodiments of the invention relate to a matrix-based power management and distribution architecture that may address one or more of these or other problems.

Figure 1:
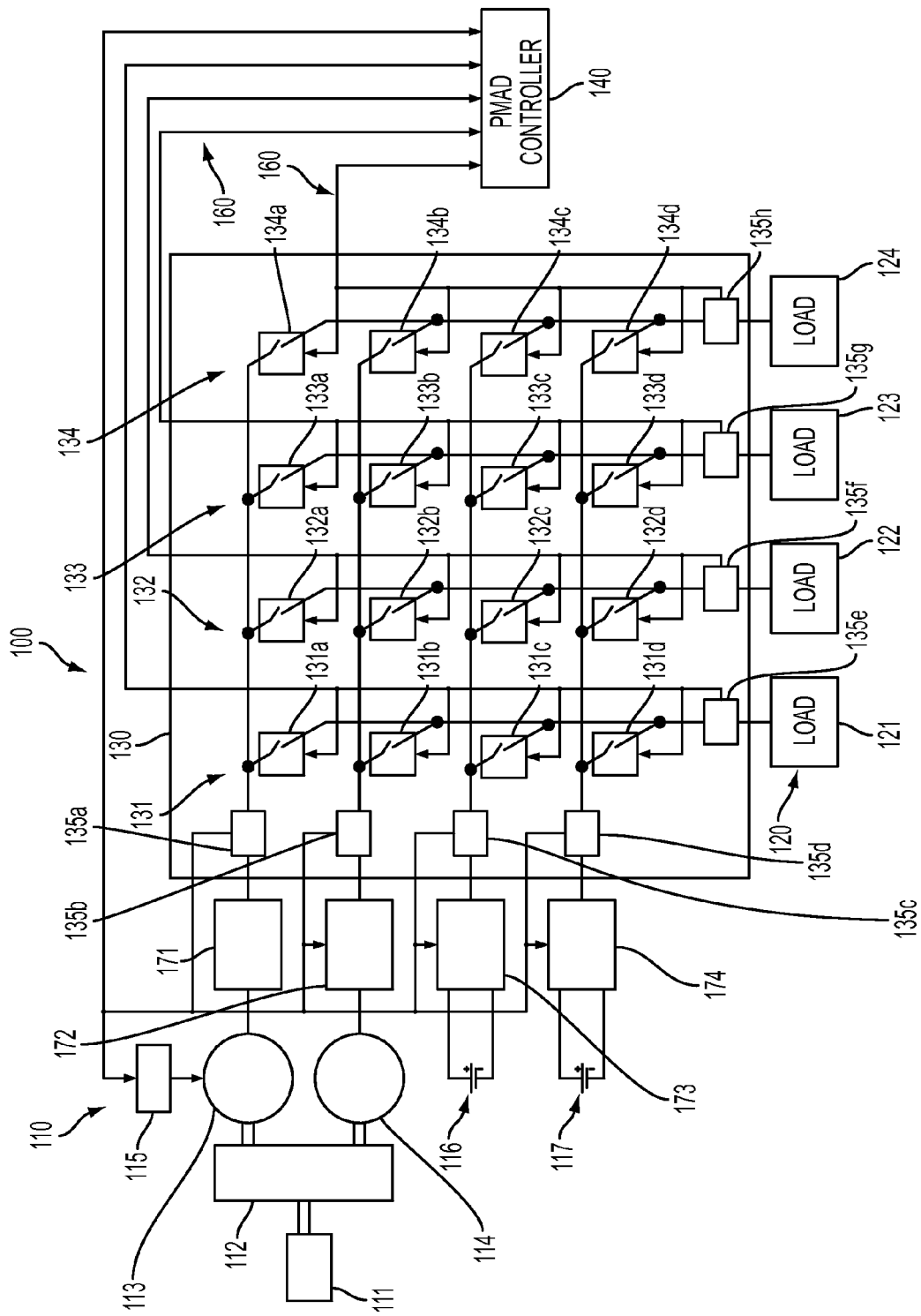
FIG. 1 illustrates a diagram of a matrix-based power management and distribution architecture according to one embodiment of the invention.

FIG. 1 illustrates a matrix-based power management and distribution system 100 according to an embodiment of the invention. The system 100 includes power supplies 110, loads 120 that receive power from the power supplies 110 and a matrix 130 of solid state power controllers (SSPC) that are controlled to form paths for power between the power supplies 110 and the loads 120. A power management and distribution (PMAD) controller 140 controls the SSPCs of the matrix 130 to generate the current paths between the power supplies 110 and the loads 120.

The system 100 includes a communication bus 160 between the PMAD controller 140 and the power supplies 110 by which the PMAD controller 140 receives information regarding the power output by the power supplies 110 and the PMAD controller 140 controls the power output by the power supplies 110. In one embodiment, the PMAD controller 140 also controls the on/off states of switches in the SSPCs of the SSPC matrix 130 via the communication bus 160. Although a bus 160 is illustrated in FIG. 1, embodiments of the invention encompass any communication lines, including dedicated communication lines, wireless communication lines, parallel and serial communication, separate communication buses for each type of signal being transmitted and any other method of communicating data.

FIG. 1 illustrates power supplies 110 of different types. In particular, the power supplies include a wound field generator 113, a permanent magnet generator 114, a high voltage battery 116 and a low voltage battery 117. The wound field generator 113 and the permanent magnet generator 114 generate power based on the motion of a prime mover 111 which may be connected to the wound field generator 113 and the permanent magnet generator 114 via a gear box 112. The voltage output by the wound field generator 113 is controlled by a voltage regulator 115 connected to the wound field generator 113, and an output voltage is rectified by the rectifier 171. The rectified output voltage is then provided to the matrix 130 of SSPCs. The alternative current (ac) voltage output of the permanent magnet generator 114 is converted to dc voltage by a bi-directional active rectifier 172.

The high voltage battery 116 and the low voltage battery 117 are connected to the matrix 130 of SSPCs via bi-directional DC to DC converters 173 and 174. The converters 173 and 174 receive as inputs the power from the batteries 116 and 117 and output a predetermined power level to the matrix 130. In addition, since the DC to DC converters 173 and 174 are bi-directional, they may receive power from the matrix 130 and transfer the power to the batteries 116 and 117.

FIG. 1 illustrates only four different types of power supplies 110. In the present specification, different types of power supplies are defined as power supplies having different modes of generating power, different principles of operation, different levels of output power capable of being generated, formed of different materials, having different physical or chemical structures, etc. For example, the wound field generator 113 has a different mode of operation than the permanent magnet generator 114 and the batteries 116 and 117. Similarly, the high voltage battery 116 outputs a different voltage level than the low voltage battery 117 and may be of a different size and of a different physical or chemical composition than the low voltage battery 117. Although four examples of different types of power supplies 110 are provided, embodiments of the invention encompass any type of power, such as renewable energy sources including solar power generators, geothermal generators and wind power generators, as well as fuel cells or any other type of power source.

In addition, while four power supplies 115 to 117 are illustrated for purposes of description, any number of power supplies 110 may exist in the system 100, such as three, four, ten, etc. Each power supply outputs power to the SSPC matrix 130. In embodiments of the invention, the power outputs of each power supply 113 to 117 may be adjusted based on power characteristics detected by current sensors 135a to 135d and 135e to 135h.

FIG. 1 further illustrates four loads 121, 122, 123 and 124. However, any number of loads may exist in the system 100. The loads 121 to 124 may correspond to electronic circuitry that require power, other electrical or electromechanical devices, batteries that may be charged, or any other devices capable of consuming power. Some loads, such as actuators, are regenerative loads. The regenerative power may need to be handled by a power dissipating device, or by diverting regenerative power to the other loads, charging battery, or converting regenerative energy into mechanical energy via a bi-directional active rectifier, and a permanent magnet generator. In addition, FIG. 1 illustrates first, second, third and fourth SSPC stages 131, 132, 133 and 134, each made up of a plurality of SSPCs 131a to 131d, 132a to 132d, 133a to 133d and 134a to 134d. However, embodiments of the invention encompass any number of SSPC stages and any number of SSPCs per stage. For purposes of description, an SSPC stage corresponds to a series of SSPCs having power outputs connected to a same load 120 and each SSPC in each stage has a power input connected to a separate power supply 110.

In embodiments of the invention, the PMAD controller 140 is configured to determine a number of loads 120 that are to receive power. The number of loads 120 to receive power may be provided by a user, by a computer program, by a device or system connected to the PMAD controller 140 or by any other method. The PMAD controller 140 further determines a power level to be supplied to each load 120 that is to receive power. In addition, the PMAD controller 140 may determine whether certain loads 120 are to receive particular types of power. In other words, since the power supplies 110 include different types of power supplies, certain loads 120 may be configured, pre-set, or otherwise determined to receive power from a particular type of power supply, such as from a battery 116, but not from a wound field generator 113.

Based on the determinations of which loads 120 are to receive power, the power levels to be delivered to each load, and the types of power to be provided to each load, the PMAD controller 140 controls the SSPCs of the SSPC matrix 130 to deliver the desired power to the loads 120. For example, if it is determined that only load 122 is to receive power and that the level of power corresponds to the output from the power supplies 114 and 117, then the PMAD controller 140 may control the SSPCs 132b and 132d to turn on to supply power from the power supplies 114 and 117 to the load 122. On the other hand, if it is determined that each of loads 121 to 124 is to receive power, then the PMAD controller 140 may turn on the corresponding SSPCs of the matrix 130 to supply power from the appropriate power supplies 113 to 117 to the loads 121 to 124.

The PMAD controller 140 controls the SSPCs of the SSPC array 130 to selectively transfer power from one power supply to one load; from one power supply to multiple loads; from multiple power supplies to multiple loads; from multiple power supplies to one load; from one or more regenerative loads to one or more rechargeable power supplies; and any combination of the above. For example, the PMAD controller 140 may control the SSPCs of the matrix 130 to simultaneously provide power from the wound field generator 113 to the load 124 and from the high-voltage battery 116 and the low-voltage battery 117 to the load 121. In this example, SSPC 134a and SSPCs 131c and 131d are all turned on, and the rest of the SSPCs are turned off.

In another example, the PMAD controller 140 may control the SSPCs of the matrix 130 to simultaneously provide power from the permanent magnet generator 114 to each of the loads 123 and 124 and from the high-voltage battery 116 and the low-voltage battery 117 to each of the loads 121 and 122. In this example, SSPCs 133b and 134b are turned on to transfer the power from the permanent magnet generator 114, and SSPCs 131c, 132c, 131d and 132d are turned on to transfer the power from the batteries 116 and 117 to the loads 121 and 122.

In one embodiment, one or more of the loads is a capacitive load and supplying power to the loads includes a pre-charging operation. Examples of capacitive loads include motor drive inverters or DC to DC converters that utilize large dc link capacitors. At power-up the dc link capacitors are discharged and may cause large inrush current when a nominal dc bus voltage is applied to the input of a motor drive inverter or DC to DC converter. When a load 120 is a capacitive load, one or more of the controllable power buses defined by the SSPC matrix 130 may be used to gradually increase the bus voltage to pre-charge the capacitive loads sequentially or at the same time therefore, limiting inrush current. For example, if the loads 121 and 122 are capacitive loads requiring pre-charging, SSPC 131a may be turned on to provide power from the wound field generator 113 to the load 121, and SSPC 132c may be turned on to provide power from the high-voltage battery 116 to the load 122. As part of the pre-charging operation, or after the pre-charging, additional power may be provided, such as by turning on SSPC 132d to further supply power form the low-voltage battery 117 to the load 122, and by turning on SSPC 131b to further supply power from the permanent magnet generator 114 to the load 121.

In addition, embodiments of the present invention encompass bi-directional SSPCs that allow current to flow from an input-to-output direction or from an output-to-input direction according to a desired power output level. The bi-directional SSPC may also interrupt current in both directions. This feature facilitates the isolation of faulty sources. In the present specification, the term "power input" as it relates to the SSPCs of the SSPC matrix 130 refers to the end of the SSPCs connected to the power line, or power bus, output from the power supplies 110. Conversely, the term "power output" as it relates to the SSPCs of the SSPC matrix 130 refers to the end of the SSPCs connected to the line input to the loads 120. However, as discussed above, in embodiments of the invention, current may be controlled to flow bi-directionally through the SSPCs.

In one example configuration of the matrix 130, one or more of the loads 120 is a regenerative load that may receive power and may also regenerate power back into the matrix 130. In such an example, power from the regenerative load may be transferred from the load to one or more of the power supplies 110, such as the batteries 116 and 117 or the permanent magnet generator 114 via a bi-directional active rectifier 172. For example, if the load 122 is a regenerative load, SSPCs 132c and/or 133c may be turned on to provide power from the regenerative load 122 to each of the high-voltage battery 116 and/or the load 123. In addition, SSPC 132b may be turned on to further provide power from the regenerative load 122 to the permanent magnet generator 114 that supplies mechanical energy via gearbox 112 to the prime mover 111. Only a few examples are provided of possible configurations for transferring power from the power supplies 110 to the loads 121 to 124. However, embodiments of the invention encompass any configuration for transferring power from one or more power supplies 110 through the matrix 130 to one or more loads 120. Embodiments of the invention also encompass any configuration for transferring power from one or more power supplies 110 to another power supply 110, such as a rechargeable power supply. Embodiments of the invention further encompass any configuration of the matrix 130 for providing power from one or more regenerative loads 120 to one or more other loads 120 or one or more power supplies 110.

Figure 2:
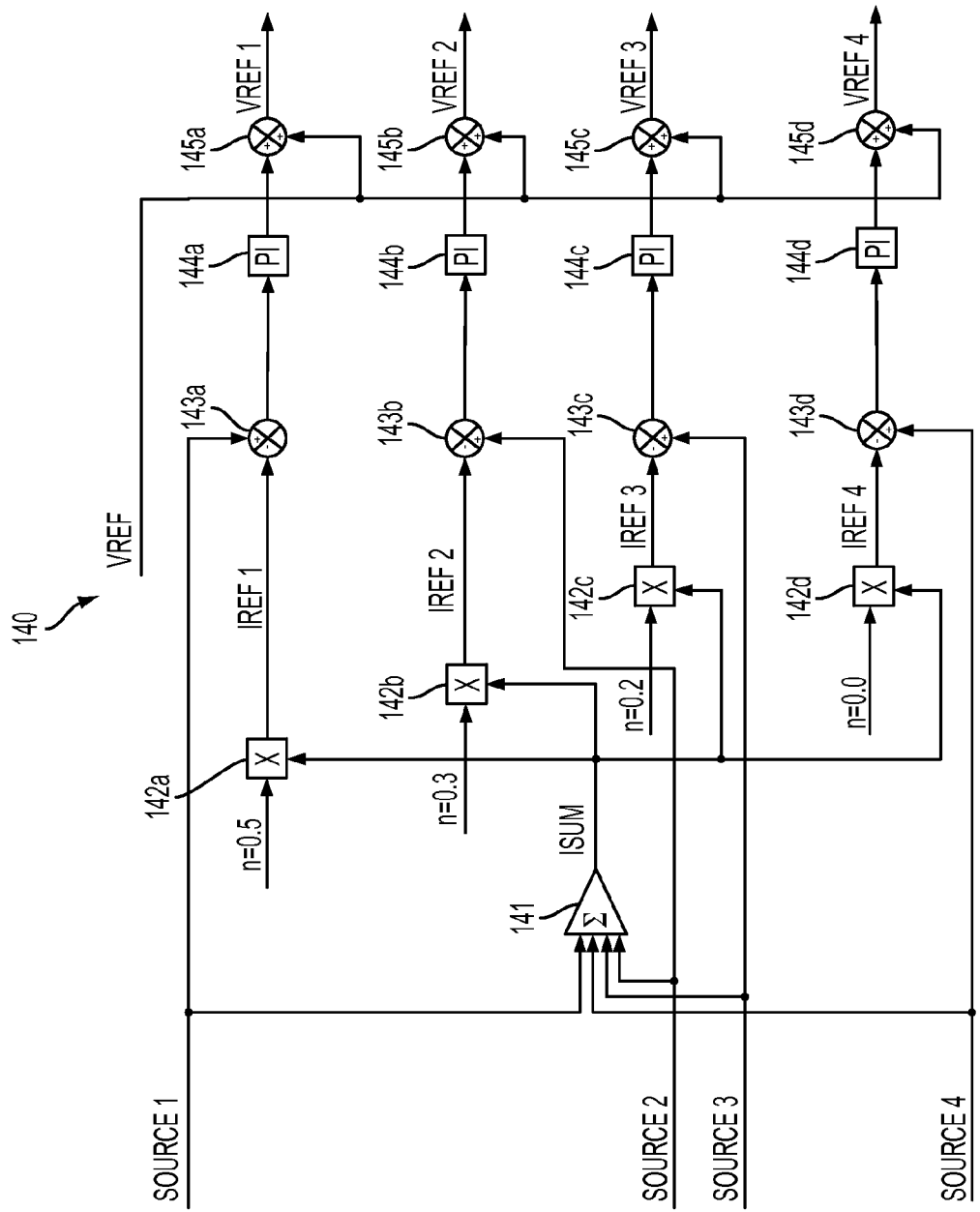
FIG. 2 is a block diagram of a load sharing architecture according to one embodiment of the invention.

FIG. 2 illustrates a load sharing architecture implemented by a PMAD controller 140 according to an embodiment of the invention. The load sharing control can be implemented in a microcontroller. The architecture may include or comprise software executed by a processor to receive signals as inputs, analyze combine the signals, and output adjusted signals to control devices such as power supplies and SSPCs.

The PMAD controller 140 includes a summing amplifier 141 configured to receive as inputs sensor signals SOURCE 1 to SOURCE 4 corresponding to power sensors in an SSPC matrix and to output a current sum signal $I_{SUM}$. For example, referring to FIG. 1, the signals SOURCE 1 to SOURCE 4 may originate from the current sensors 135a to 135d. The current sensors 135e to 135h are used among other functions for load short circuit and 12t overload protections The current sum signal, $I_{SUM}$, is provided to weighting units 142a to 142d, which weight the sum signal to provide different current signals for each power bus, or each line connected to a power output of a power supply, of an SSPC matrix. In one embodiment, the weighting units multiply the current sum signal, $I_{SUM}$, by a fraction, and the fractions of all of the weighting units 142a to 142d add up to "1" or one hundred percent. The different weights assigned to the different power buses may be based on the capability or efficiency of the power bus or the power supply, on a power level that is desired on the power bus, or on any other criteria. For example, a user, program, device or system may provide to the PMAD controller 140 desired power output levels of the respective power supplies, and the PMAD controller 140 may assign weights to the weighting units 142a to 142d accordingly. Referring to FIG. 2, the first weighting unit 142a multiplies the current sum signal, $I_{SUM}$, by 0.5; the second weighting unit 142b multiplies the current sum signal, $I_{sum}$, by 0.3; the third weighting unit 142c multiplies the current sum signal, $I_{SUM}$, by 0.2; and the fourth weighting unit 142d multiplies the current sum signal, $I_{SUM}$, by 0. The weighting units 142a to 142d output current reference signals $I_{REF1}$, $I_{REF2}$, $I_{REF3}$ and $I_{REF4}$, respectively.

The current reference signals $I_{REF1}$, $I_{REF2}$, $I_{REF3}$ and $I_{REF4}$ are compared with the respective detected current signals SOURCE 1 to SOURCE 4, and the difference is processed by a proportional-integral (PI) control block 144a to 144d. Alternatively a lag function can be used. The control blocks 144a to 144d generate reference voltage adjustment signals that are summed with a voltage reference voltage $V_{REF}$ by summing circuits 145a to 145d to generate adjusted reference voltage signals $V_{REF1}$, $V_{REF2}$, $V_{REF3}$ and $V_{REF4}$ to control each power supply.

Referring to FIG. 1, the PMAD controller 140 may transmit the adjusted reference voltage signals $V_{REF1}$, $V_{REF2}$, $V_{REF3}$ and $V_{REF4}$ to the voltage regulator 115 of the wound field generator 113, to the active rectifier 172 of the permanent magnet generator 114 and to the DC to DC converters 173 and 174 of the batteries 116 and 117 to control the output of the respective power supplies 110. The adjusted reference voltage signals $V_{REF1}$, $V_{REF2}$, $V_{REF3}$ and $V_{REF4}$ may be transmitted via a bus 160, and the current sensor signals from the current sensors 135a to 135h may also be transmitted via the bus 160. In addition, control signals from the PMAD controller 140 to the SSPCs of the SSPC matrix 130 may be transmitted via the bus 160. Although a bus 160 is illustrated in FIG. 1, embodiments of the invention encompass any communication lines, including dedicated communication lines, wireless communication lines, parallel and serial communication, separate communication buses for each type of signal being transmitted and any other method of digitally communicating data.

Figure 3:
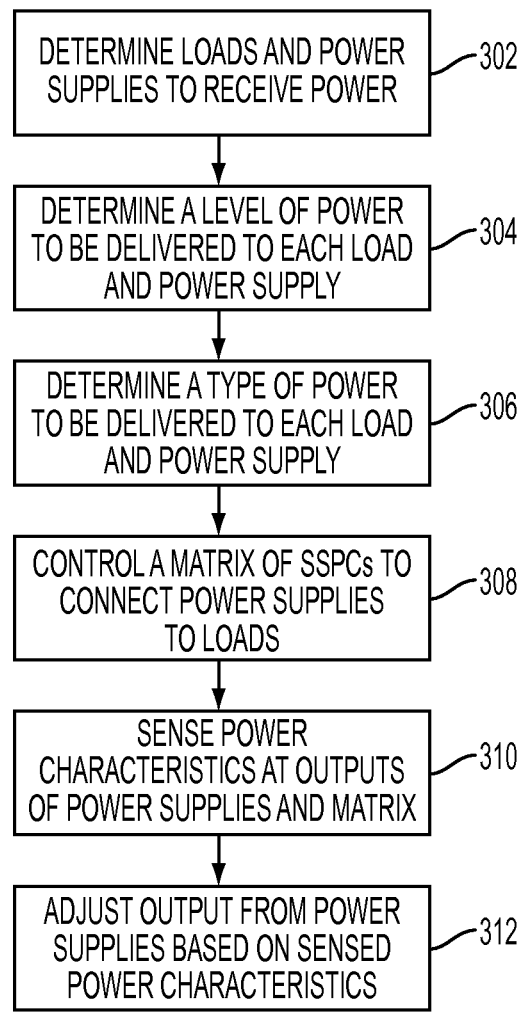
FIG. 3 is a flowchart of a method for controlling a matrix-based power management and distribution system according to an embodiment of the invention.

FIG. 3 illustrates a method of controlling a matrix-based power management and distribution (PMAD) system according to embodiments of the present invention. The system includes power supplies and loads connected to each other by a reconfigurable solid-state power controller (SSPC) matrix. Individual SSPCs of the matrix may be turned on to provide power paths between respective power supplies and respective loads.

In block 302, the loads and power supplies that are to receive power are determined. The loads and power supplies that are to receive power may be determined by a user, by a control system or program, or by any other method. In some embodiments, one or more loads may be regenerative loads that to be handled by redirecting regenerative energy to charging the battery, transferring to another load or converting to mechanical energy.

In block 304, the level of power to be supplied to each of the loads or power supplies is determined. For example, it may be determined whether one load is to receive power corresponding to one power supply or two or more power supplies, whether multiple loads are to receive power corresponding to one or more power supplies, whether both loads and power supplies are to receive power from one or more other loads or power supplies or any other variation of supplying power from one or more power supplies and loads to one or more other power supplies and loads. In examples in which only a small amount of power is required by a load, a PMAD controller may determine that the load may receive power from a low-power source. Alternatively, when a high power level is required by a load, the PMAD controller may determine that the load may receive power from one or more high-power sources, from multiple low-power sources, or from a combination of high- and low-power sources.

In block 306, a type of power to be delivered to the loads and power supplies is determined. For example, a load may only be capable of receiving highly-regulated power with very low voltage or current variation. In such a case, the PMAD controller may select from among power supplies that meet the requirements of the particular load to deliver the power. In block 308, the SSPC matrix is controlled to connect the power supplies and loads to provide the appropriate power levels to the power supplies and loads. The matrix comprises multiple stages of SSPCs, where each stage includes multiple SSPCs, each having a power input connected to a separate power supply and a power output connected to the same load. The SSPCs may be bi-directional SSPCs to permit current flow from an output-to-input direction to route power around failed circuitry, such as failed SSPCs, to accommodate regenerative loads, or for any other purpose. A bi-directional SSPC may also interrupt current in both directions to allow isolation of either a faulty load or a faulty power supply.

In block 310, power characteristics, such as current, output from the power supplies and the SSPC matrix are detected. The power characteristics may be supplied to a PMAD controller, which may control, in block 312, the power supplies and the SSPCs based on the detected power characteristics. As discussed above, a PMAD controller may adjust a reference voltage to power supplies based on the sensed power characteristics to adjust the power output from the power supplies.

In embodiments of the present invention, a matrix of solid-state power controllers (SSPCs) is used to dynamically transfer power between a plurality of power supplies and a plurality of loads. The power supplies may have different principles of operation and different physical or chemical compositions, so that power supplied to the loads from the power supplies may vary in power level, current level, voltage level, output power quality or any other characteristic. The loads that receive power, and the amount of power received at each load, are adjusted by turning on and off SSPCs of the matrix. Accordingly, one load may receive power from one power supply or from multiple power supplies. In addition, multiple loads may receive power from one power supply or from multiple power supplies. By controlling the SSPCs that are turned on and off, a power management and distribution (PMAD) controller can isolate faulty power supplies and faulty loads, while continuing to provide power to functional power supplies and loads. In addition, by controlling the SSPCs that are turned on and off, the PMAD controller can re-route power around faulty SSPCs to provide power to loads even when one or more SSPCs in the matrix is turned off, incapable of reliably providing power, or otherwise faulty.

In embodiments of the invention, the PMAD controller may include software and hardware to detect faults in a power supply, in SSPCs and in loads. For example, the PMAD controller may detect a faulty power supply or faulty load by detecting power characteristic levels outside predetermined thresholds via sensor signals from the power supply or from the SSPC matrix electrically connected to the power supply or load. The SSPC matrix permits load-sharing by power buses, or power lines output from power supplies, to minimize current stresses on each bus. In addition, the SSPC matrix eliminates the need for any single power supply or SSPC requiring a very high overload tolerance, since in an overload condition, power to a load may be supplied from an additional power supply rather than increasing a power output from a same power supply. In addition, the SSPC matrix eliminates a need for having a current sensor within each SSPC to accommodate PMAD functions. Matrix SSPC utilizes current sensors associated with each power source and each load to maintain PMAD functions, resulting in a reduction in the number of current sensors within a system.

In addition, by providing connecting to the SSPC matrix power supplies having different power quality levels, the cost, weight and efficiency of the power system may be optimized by providing the capability to provide power with different quality levels to different loads at different times without physically connecting or disconnecting the power supplies to the matrix. In addition, the SSPC matrix allows for controlling regenerative loads with reduced power dissipating devices and controlling in-rush current due to discharged capacitive loads.

In some embodiments, the system includes no electro-mechanical circuit breaker. Instead, the SSPC matrix replaces the functionality of the electro-mechanical circuit breaker to control current flow in the system. In some embodiments, no "OR" diodes exist in the system to connect multiple power buses. Instead, only the SSPC matrix connects the multiple power buses.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A power management and distribution (PMAD) system, comprising:
a first power supply of a first type;
a second power supply of a second type different from the first type;
first and second loads; and
a matrix of solid state power controllers (SSPCs) connected between the first and second power supplies and the first and second loads, the matrix configured to selectively supply each of the first and second loads with a plurality of different power levels based on on/off states of the SSPCs of the matrix.

2. The PMAD system of claim 1, wherein the matrix comprises:
first and second stages of solid state power controllers (SSPCs), the first stage of SSPCs including a first SSPC having a power input connected to the first power supply and a power output connected to the first load and a second SSPC having a power input connected to the second power supply and a power output connected to the first load, and the second stage of SSPCs including a third SSPC having a power input connected to the first power supply and a power output connected to the second load and a fourth SSPC having a power input connected to the second power supply and a power output connected to the second load.

3. The PMAD system of claim 2, further comprising:
a third power supply of a different type than the first and second power supplies;
a third load; and
a third stage of SSPCs, the third stage of SSPCs including a fifth SSPC having a power input connected to the first power supply and a power output connected to the third load, a sixth SSPC having a power input connected to the second power supply and a power output connected to the third load, and a seventh SSPC having a power input connected to the third power supply and a power output connected to the third load,
wherein the first stage of SSPCs includes an eighth SSPC having a power input connected to the third power supply and a power output connected to the first load, and the second stage of SSPCs includes a ninth SSPC having a power input connected to the third power supply and a power output connected to the second load.

4. The PMAD system of claim 3, wherein the first, second and third power supplies are selected from a group consisting of: a wound field generator, a permanent magnet generator, a high voltage battery, a low voltage battery and a fuel cell.

5. The PMAD system of claim 1, further comprising:
a PMAD controller configured to control each of the SSPCs of the matrix to selectively output a predetermined voltage to each of the first and second loads.

6. The PMAD system of claim 5, further comprising:
a first current sensor connected between an input of the first load and each of the power outputs of the first and second SSPCs; and
a second current sensor connected between an input of the second load and each of the power outputs of the third and fourth SSPCs,
wherein the PMAD controller is configured to adjust a power output from the first and second power supplies based on the sensed current received from the first and second current sensors.

7. The PMAD system of claim 6, wherein the PMAD controller is configured to sum the sensed current from all of the SSPCs of the matrix connected to the power sources to generate a summed sensed current, multiply the summed sensed current by a fraction corresponding to a ratio of total power to be output to the first and second loads, respectively, to generate a reference voltage modification signal, and to adjust a reference voltage supplied to the first and second power supplies based on the reference voltage modification signal.

8. The PMAD system of claim 1, further comprising:
a third power supply and a fourth power supply, the first power supply being a wound field generator, the second power supply being a permanent magnet generator, the third power supply being a high voltage battery and the fourth power supply being a low voltage battery,
wherein the matrix of SSPCs includes four stages of SSPCs, each stage including four SSPCs, each SSPC of each respective stage connected to a separate one of the first to fourth power supplies, each SSPC of each respective stage having a power output connected to a same load, and each stage of SSPCs connected to a separate load than each other stage.

9. The PMAD system of claim 8, further comprising:
a rectifier between the wound field generator and the matrix of SSPCs;
an active rectifier between the permanent magnet generator and the matrix of SSPCs;
a DC to DC converter between the high voltage battery and the matrix of SSPCs; and
a DC to DC converter between the low voltage battery and the matrix of SSPCs.

10. The PMAD system of claim 9, further comprising:
a first current sensor between the rectifier and the matrix of SSPCs;
a second current sensor between the active rectifier and the matrix of SSPCs;
a third current sensor between the high voltage battery and the matrix of SSPCs;
a fourth current sensor between the low voltage battery and the matrix of SSPCs; and
a PMAD controller configured to adjust a power output from the first, second, third and fourth power supplies based on the sensed current received from first to fourth current sensors.

11. The PMAD system of claim 1, wherein at least one of the first and second loads is a capacitive load and at least one SSPC of the matrix is turned on to connect one of the first and second power supplies to the capacitive load to pre-charge the capacitive load.

12. The PMAD system of claim 11, wherein at least two SSPCs of the matrix are sequentially turned on to sequentially connect the first and second power supplies to the capacitive load to incrementally pre-charge the capacitive load.

13. The PMAD system of claim 1, wherein at least one of the first and second power supplies is a rechargeable battery,
at least one of the first and second loads is a regenerative load, and
at least one SSPC of the matrix is a bi-directional SSPC that is turned on to supply power from the regenerative load to the rechargeable battery.

14. The PMAD system of claim 1, wherein the first load has a first power quality requirement and the second load has a second power quality requirement less stringent than the first load,
the first power supply has a first power quality satisfying the first power quality requirement, and
the second power supply has a second power quality satisfying the second power quality requirement.

15. A power management and distribution (PMAD) controller of a matrix-based PMAD system, comprising:
a summing amplifier configured to receive as inputs first and second sensed current signals from first and second current sensors of an SSPD matrix between a plurality of power supplies and a plurality of loads;
a reference voltage modification circuit configured to receive as an input a summed sensed current signal from the summing amplifier, to generate first and second current reference signals by multiplying the summed sensed current signal by a fraction corresponding to a fraction of total current supplied to first and second loads among the plurality of loads, and to output to first and second power supplies among the plurality of power supplies first and second reference voltage modification signals based on the first and second current reference signals to modify a voltage output from the first and second power supplies.

16. The PMAD controller of claim 15, wherein the reference voltage modification circuit comprises:
    first and second summing circuits configured to generate first and second adjusted current reference signals by summing the first and second current reference signals with the first sensed current signal and the second sensed current signal, respectively.

17. The PMAD controller of claim 16, wherein the reference voltage modification circuit further comprises:
    third and fourth summing circuits configured to generate the reference voltage modification signals by summing the first and second adjusted reference current signals, respectively, with a reference voltage signal.

18. A method of controlling a matrix-based power management and distribution (PMAD) system, comprising:
    determining a level of power to be received by each of a plurality of loads; and
    controlling a matrix of solid-state power controllers (SSPCs) connected between a plurality of power supplies and the plurality of loads to deliver the level of power to the loads, the plurality of power supplies including a first power supply of a first type and a second power supply of a second type different than the first type.

19. The method of claim 18, wherein controlling the matrix of SSPCs comprises:
    turning on a first SSPC having a power input connected to an output of the first power supply and an output connected to a first load among the plurality of loads, and turning on a second SSPC having a power input connected to an output of the second power supply and an output connected to the first load to provide a power level to the first load corresponding to a combined power of the first and second power supplies.

20. The method of claim 18, wherein controlling the matrix of SSPCs comprises:
    receiving, by a PMAD controller, first and second current sensor signals from output lines of the matrix of SSPCs, the first and second SSPCs connected to at least one load among the plurality of loads; and
    controlling a power output from the plurality of power supplies to the matrix of SSPCs based on the first and second current sensor signals.

* * * * *